United States Patent Office 2,806,043
Patented Sept. 10, 1957

2,806,043

16-ALPHA OXY-$\Delta^{1,4}$-PREGNADIENES

Seymour Bernstein and William S. Allen, Pearl River, N. Y., assignors to American Cyanamid Company, New York, N. Y., a corporation of Maine No Drawing. Application June 11, 1956,
Serial No. 590,791

4 Claims. (Cl. 260—397.45)

This invention relates to new $\Delta^{1,4}$-steroids. More particularly, it relates to steroids containing the $\Delta^{1,4}$-pregnadiene-3,11,20-trione moiety.

Recently a number of steroids of the pregnene and pregnadiene series, such as hydrocortisone and 1-dehydrohydrocortisone, have become important therapeutic agents and useful as intermediates for the preparation of other therapeutically useful steroids. The compounds of the present invention are useful as anti-inflammatory agents in the treatment of arthritis, asthma, burns, bursitis, and the like, and also in the treatment of skin disorders and collagen diseases. The compounds are used in combination with fillers, excipients, etc., in tablets, powders, pills, etc. They can also be used parenterally in a solution or in a suspension.

The compounds of the present invention can be illustrated by the following structural formula:

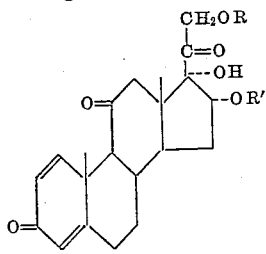

in which R and R' are hydrogen or a lower alkanoyl radical.

The compounds of the present invention are crystalline solids, having a definite melting point. They are, in general, soluble in the usual organic solvents.

The present compounds are prepared from the corresponding 16α,21-di-loweralkanoyl derivatives of 11β,17α-dihydroxy-1,4-pregnadiene-3,20-dione by oxidation with chromium trioxide. Following oxidation, the lower alkanoyl groups can be removed by saponification.

The starting material used in the process of the present invention can be prepared either chemically or biologically. The example hereinafter describes the preparation of 16α,21-di-loweralkanoyl derivatives of 11β,17α-dihydroxy-1,4-pregnadiene-3,20-dione by a fermentative method using, for example, the fungus *Corynebacterium simplex*. The substrate or starting material used with the fungus is 11β,16α,17α,21-tetrahydroxy-4-pregnene-3,20-dione.

In carrying out the process of the present invention a 16α,21-di-loweralkanoyl ester of 11β,17α-dihydroxy-1,4-pregnadiene-3,20-dione is dissolved in a solvent such as pyridine. A solution of an oxidizing agent such as chromium trioxide in pyridine is added, and the mixture is allowed to stand at room temperature. After the reaction is complete, a further solvent is added, such as a lower alkyl alcohol, and the solvents are removed by evaporation under reduced pressure. The product is purified by methods well known to those skilled in the art.

The following example illustrates the process of the present invention:

Example

A Trypticase soy agar test tube slant was washed with 5 ml. of sterile water, and the resulting cell suspension of *Corynebacterium simplex* was used to inoculate 100 ml. of sterile Trypticase soy broth medium in a 500 ml. Erlenmeyer flask. This mixture was incubated with shaking at 37° C. for eight hours. Twenty-five 500 ml. Erlenmeyer flasks, each containing 100 ml. of sterile Trypticase soy broth medium without glycerol, were each inoculated with 1 ml. of the eight-hour-old inoculum. These flasks were incubated at 32° C. for 40 hours. At this time, 40 mg. of 11β,16α,17α,21-tetrahydroxy-4-pregnene-3,20-dione dissolved in 4 ml. of ethanol were added to each flask, and the fermentation was continued for eight hours at 32° C. The contents of all 25 flasks were pooled, giving a mash of pH 8.1.

The pooled beer, after harvest, was extracted once with 3 liters of methylene chloride and three times with 2-liter portions of methylene chloride. The combined extract was washed once with saturated saline and evaporated to dryness under reduced pressure. This gave 509 mg. of oily residue, which was dissolved in 1.5 ml. of the stationary phase from the system, 3 parts ethyl acetate:2 parts petroleum ether (90–100° C.):3 parts methanol:2 parts water, and mixed with 3 g. of diatomaceous earth. This impregnated diatomaceous earth was then packed on top of a 1.5 x 35 cm. glass column containing 25 g. of diatomaceous earth impregnated with 12.5 ml. of the stationary phase from the above system. The 11β,16α,17α,21-tetrahydroxy-1,4-pregnadiene-3,20-dione was then eluted with the mobile phase from the above system, giving 207 mg. of crude solid. This was crystallized from acetone-petroleum ether (60°–70° C.) to give 56 mg. Recrystallization from the same solvent gave a melting point to 202°–205° C. (block); melting point, 229°–231° C. (capillary method).

The physical and chemical properties of the compound were those for 11β,16α,17α,21-tetrahydroxy-1,4-pregnadiene-3,20-dione.

A mixture of 2.5 g. 11β,16α,17α,21-tetrahydroxy-1,4-pregnadiene-3,20-dione, obtained above, in 100 ml. of pyridine containing 25 ml. of acetic anhydride was allowed to stand overnight at room temperature, after which the solution was evaporated to dryness under reduced pressure. The solid residue was crystallized from ethyl acetate-petroleum ether (90°–100° C.), giving 16α,21-diacetoxy-11β,17α-dihydroxy-1,4-pregnadiene-3,20-dione in two fractions: (*a*) melting point 215°–217° C., weight 1.03 g. and (*b*) melting point 217°–219° C., weight 1.2 g. Recrystallization of a portion of (*b*) from the same solvent pair did not alter the melting point.

*Analysis.*—Calc'd for $C_{25}H_{32}O_8$ (460.51): C, 65.20; H, 7.00. Found: C, 64.88; H, 7.31.

A solution of 200 mg. of 16α,21-diacetoxy-11β,17α-dihydroxy-1,4-pregnadiene-3,20-dione in 10 ml. of dry pyridine was treated with a solution of 150 mg. of chromium trioxide in 8 ml. of pyridine and the mixture allowed to stand overnight at room temperature. Then 10 ml. of methanol was added and the solvents were evaporated off under reduced pressure. Water was added to the dry residue, and the mixture was extracted with five-200 ml. portions of ethyl acetate. The combined extract was dried over anhydrous sodium sulfate and evaporated to a solid residue of 16α,21-diacetoxy-17α-hydroxy-1,4-pregnadiene-3,11,20-trione, which on crystallization from ethyl acetate-petroleum ether (90°–100° C.) gave 128 mg., melting point 216°–217° C. (64%). Repeated crystallization from the same solvent pair changed the melting point to 208–209° C., $[\alpha]_D +133°$ C. (methanol).

*Analysis.*—Calc'd for $C_{25}H_{30}O_8$ (458.49): C, 65.49; H, 6.60. Found: C, 65.21; H, 6.68.

We claim:

1. Compounds having the general formula

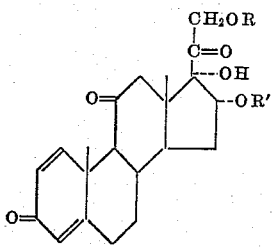

in which R and R' are members of the group consisting of hydrogen and lower alkanoyl radicals.

2. Compounds in accordance with claim 1 in which R and R' are lower alkanoyl radicals.

3. The compound 16α,21-diacetoxy-17α-hydroxy-1,4-pregnadiene-3,11-20-trione.

4. The compound 16α,17α,21-trihydroxy-1,4-pregnadiene-3,11,20-trione.

References Cited in the file of this patent

UNITED STATES PATENTS

| | | |
|---|---|---|
| 2,736,734 | Sarett | Feb. 28, 1956 |
| 2,767,199 | Djerassi | Oct. 16, 1956 |
| 2,773,058 | Bernstein | Dec. 4, 1956 |
| 2,773,080 | Bernstein | Dec. 4, 1956 |
| 2,774,775 | Korman | Dec. 18, 1956 |